United States Patent [19]

Jones et al.

[11] 4,327,159

[45] Apr. 27, 1982

[54] NON-AQUEOUS ELECTROCHEMICAL CELL

[75] Inventors: Steven D. Jones, Brook Park; George E. Blomgren, Lakewood, both of Ohio

[73] Assignee: Union Carbide Corporation, Danbury, Conn.

[21] Appl. No.: 220,281

[22] Filed: Dec. 29, 1980

[51] Int. Cl.$^3$ ............................................. H01M 6/14
[52] U.S. Cl. .................................. 429/101; 429/105; 429/196
[58] Field of Search ..................... 429/196, 101, 105

[56] References Cited

U.S. PATENT DOCUMENTS 3,897,264  7/1975  Auborn ................................ 429/196
4,218,523  8/1980  Kalnoki-Kis ........................ 429/196

Primary Examiner—Donald L. Walton
Attorney, Agent, or Firm—Cornelius F. O'Brien

[57] ABSTRACT

A non-aqueous electrochemical cell employing a liquid cathode which comprises an halogenocarbonylchalcogenyl halide.

9 Claims, No Drawings

NON-AQUEOUS ELECTROCHEMICAL CELL

FIELD OF THE INVENTION

The invention relates to a non-aqueous electrochemical cell employing a liquid cathode comprising at least one halogenocarbonylchalcogenyl halide.

BACKGROUND OF THE INVENTION

The development of high energy battery systems requires, among other things, the compatibility of an electrolyte solution possessing desirable electrochemical properties with highly reactive anode materials, such as sodium and lithium. The use of aqueous electrolytes is precluded in these systems since the anode materials are sufficiently active to react with water chemically. It has, therefore, been necessary, in order to realize the high energy density obtainable through use of these highly reactive anodes, to turn to the investigation of non-aqueous electrolyte systems.

The term "non-aqueous electrolyte" as used herein refers to an electrolyte solution which is composed of a solute such as, for example, a metal salt or a complex salt of Group I-A, Group II-A or Group III-A elements of the Periodic Table, dissolved in an appropriate nonaqueous solvent. The term "Periodic Table" as used herein refers to the Periodic Table of Elements as set forth on the inside front cover of the Handbook of Chemistry and Physics, 60th Edition, CRC Press Inc., Boca Raton, Florida, 1979–1980.

A multitude of solutes is known and many have been suggested for use but the selection of a suitable solvent has been particularly troublesome. The ideal battery electrolyte would comprise a solvent-solute pair which has a long liquid range, high ionic conductivity and stability. A long liquid range, i.e., high boiling point and low freezing point, is essential if the battery is to operate at other than normal ambient temperatures. High ionic conductivity is necessary if the battery is to have high rate capability. Stability is necessary with the electrode materials, the materials of cell construction and the products of the cell reaction to provide long shelf life when used in a primary or secondary battery system.

It has been disclosed in the literature that certain materials are capable of acting both as an electrolyte carrier, i.e., as solvent for the electrolyte salt, and as the active cathode for a non-aqueous electrochemical cell. U.S. Pat. Nos. 3,475,226, 3,567,515 and 3,578,500 each disclose that liquid sulfur dioxide or solutions of sulfur dioxide and a cosolvent will perform this dual function in non-aqueous electrochemical cells. While these solutions perform their dual function, they are not without several disadvantages in use. Sulfur dioxide is always present and, being a gas at ordinary temperatures, it must be contained in the cell as a liquid under pressure or dissolved in a liquid solvent. Handling and packaging problems are created if the sulfur dioxide is used alone, and an additional component and assembly step are necessary if sulfur dioxide is to be dissolved in a liquid solvent. As stated above, a long liquid range encompassing normal ambient temperature is a desirable characteristic in an electrolyte solvent. Obviously, sulfur dioxide is deficient in this respect at atmospheric pressure.

U.S. application Ser. No. 439,521 by G. E. Blomgren et al, filed Feb. 4, 1974, discloses a non-aqueous electrochemical cell comprising an anode, a cathode collector and a cathode-electrolyte, said cathode-electrolyte comprising a solution of an ionically conductive solute dissolved in an active cathode depolarizer wherein said active cathode depolarizer consists of a liquid oxyhalide of an element of Group V or Group VI of the Periodic Table.

U.S. application Ser. No. 474,267 by G. E. Blomgren et al, filed May 29, 1974, discloses a non-aqueous electrochemical cell employing a cathode-electrolyte consisting of an ionizing solute dissolved in a liquid halide solvent and a cosolvent, said liquid halide being selected from the group consisting of sulfur monochloride ($S_2Cl_2$), sulfur monobromide ($S_2Br_2$), selenium tetrafluoride ($SeF_4$), selenium monobromide ($Se_2Br_2$), thiophosphoryl chloride ($PSCl_3$), thiophosphoryl bromide ($PSBr_3$), vanadium pentafluoride ($VF_5$), lead tetrachloride ($PbCl_4$), titanium tetrachloride ($TiCl_4$), disulfur decafluoride ($S_2F_{10}$), tin bromide trichloride ($SnBrCl_3$), tin dibromide dichloride ($SnBr_2Cl_2$) and tin tribromide chloride ($SnBr_3Cl$).

One of the objects of the present invention is to provide a new group of liquid cathodic materials that have a long liquid range for use in nonaqueous cells.

Another object of the present invention is to provide a new group of liquid cathodic materials that are relatively stable with anodes such as lithium and have a relatively low reactivity with atmospheric water vapor thus making them suitable for use in non-aqueous cell systems.

The foregoing and additional objects will become more fully apparent from the following description.

SUMMARY OF THE INVENTION

The invention relates to a non-aqueous electrochemical cell comprising an anode, a cathode collector and a cathode-electrolyte comprising an ionizing solute dissolved in a cathodic solvent of a halogenocarbonylchalcogenyl halide.

A cathode (cathodic) material is the active cathode reactant and, therefore, is the material electrochemically reduced at the cathode collector. The cathode collector, whether inert or active, primarily functions as a current collector plus electronic conductor to the cathode terminal of a cell. In other words, the cathode collector when used in conjunction with a liquid active cathode material, is a situs for the electrochemical reduction reaction of the active cathode material and the electronic conductor to the cathode terminal of a cell.

A liquid active reducible cathode material is usually mixed with an ionizing solute to improve the conductivity of the liquid active reducible cathodic material or mixed with both an ionizing solute and a cosolvent material, if desired.

Halogenocarbonylchalcogenyl halides suitable for this invention as liquid cathodic materials are represented by the formula:

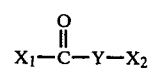

where $X_1$ and $X_2$ are halogens and Y is a chalcogen, i.e., a member of Group VIA of the Periodic Table, having an atomic number of 16 (sulfur) or more. An example of a suitable halogenocarbonylchalcogenyl halide for use as a liquid cathode is chlorocarbonylsulfenyl chloride [ClC(O)SCl]. This cathodic liquid has been found to exhibit a lower volatility as compared to $SO_2$ and possesses a relatively high solvating power for electrolyte salts. This latter characteristic will effectively eliminate the need of a cosolvent for the electrolyte solution. However, if desired, a cosolvent may be added so as to provide the benefit of lower viscosity or higher solubility of electrolyte salts for very high rate cells.

The normal method of producing ClC(O)SCl is by hydrolysis of Cl$_3$CSCl in the presence of concentrated sulfuric acid. Cl$_3$CSCl (perchloromethyl mercaptan) can be made from carbon disulfide and chlorine in the presence of I$_2$ as represented by the following reaction:

$$CS_2 + 3Cl_2 \xrightarrow{I_2} Cl_3CSCl + SCl_2$$

The perchloromethyl mercaptan can then be hydrolyzed in the presence of sulfuric acid to produce ClC(O)SCl as represented by the following reaction:

$$Cl_2CSCl + H_2O \xrightarrow{H_2SO_4} ClC(O)SCl + 2HCl.$$

Since ClC(O)SCl is a partially hydrolyzed material it will be less corrosive than the oxyhalides such as SOCl$_2$ or SO$_2$Cl$_2$.

Although not wanting to be bound by theory, it is believed that when employing ClC(O)SCl in a lithium cell system, the following reaction occurs:

$$2Li + ClC(O)SCl \rightarrow 2LiCl + COS.$$

The advantages of this new cathodic material are that it is less corrosive toward conventional cell construction materials than oxyhalides such as SOCl$_2$ and SO$_2$Cl$_2$, has a lower volatility as compared to SO$_2$, can be employed without the necessity of adding a cosolvent in the preparation of an electrolyte solution and has a high theoretical energy density.

Other such halogenocarbonylchalcogenyl halides are fluorocarbonylsulfenyl chloride [FC(O)SCl] and chlorocarbonylsulfenyl bromide [ClC(O)SBr].

Halogens for use in the generic formula of this invention can be selected from the group consisting of chlorine, fluorine, bromine and iodine. Chalcogens for use in the generic formula of this invention can be selected from the group consisting of sulfur, selenium and tellurium.

The halogenocarbonylchalcogenyl halide for use in this invention has to be electrochemically reducible and effectively chemically stable in the cell system during storage.

Any compatible solid (inert or active) which is substantially electronically conductive may be useful as a cathode collector in the cells of the present invention. It is desirable to have as much surface contact as possible between the cathode-electrolyte and the collector. It is, therefore, preferred to employ a porous collector since it will provide a high surface area interface with the liquid cathode-electrolyte. The collector may be metallic and may be present in any physical form such as a metallic film, screen or a pressed powder. Preferably, however, a pressed powder collector should be at least partially of carbonaceous or other high surface area material.

The solute may be a simple or double salt which will produce an ionically conductive solution when dissolved in the solvent. Preferred solutes are complexes of inorganic or organic Lewis acids and inorganic ionizable salts. The only requirements for utility are that the salt, whether simple or complex, be compatible with the solvent being employed and that it yield a solution which is ionically conductive. According to the Lewis or electronic concept of acids and bases, many substances which contain no active hydrogen can act as acids or acceptors of electron doublets. The basic concept is set forth in the chemical literature (Journal of the Franklin Institute, Vol. 226-July/December, 1938, pages 293-313 by G. N. Lewis).

A suggested reaction mechanism for the manner in which these complexes function in a solvent is described in detail in U.S. Pat. No. 3,542,602 wherein it is suggested that the complex or double salt formed between the Lewis acid and the ionizable salt yeilds an entity which is more stable than either of the components alone.

Typical Lewis acids suitable for use in the present invention include aluminum fluoride, aluminum bromide, aluminum chloride, antimony pentachloride, zirconium tetrachloride, phosphorus pentachloride, boron fluoride, boron chloride and boron bromide.

Ionizable salts useful in combination with the Lewis acids include lithium fluoride, lithium chloride, lithium bromide, lithium sulfide, sodium fluoride, sodium chloride, sodium bromide, potassium fluoride, potassium chloride and potassium bromide.

It will be obvious to those skilled in the art that the double salts formed by a Lewis acid and an inorganic ionizable salt may be used as such or the individual components may be added to the solvent separately to form the salt or the resulting ions in situ. One such double salt, for example, is that formed by the combination of aluminum chloride and lithium chloride to yield lithium aluminum tetrachloride.

Useful organic cosolvents which may be used in this invention, if desired, include the following classes of compounds:

Trialkyl borates: e.g., trimethyl borate, (CH$_3$O)$_3$B (liquid range, $-29.3°$ to $67°$ C.)

Tetraalkyl silicates: e.g., tetramethyl silicate, (CH$_3$O)$_4$Si (boiling point, $121°$ C.)

Nitroalkanes: e.g., nitromethane, CH$_3$NO$_2$ (liquid range, $-17°$ to $100.8°$ C.)

Alkylnitriles: e.g., acetonitrile, CH$_3$CN (liquid range, $-45°$ to $81.6°$ C.)

Dialkylamides: e.g., dimethylformamide, HCON(CH$_3$)$_2$ (liquid range, $-60°$ to $149°$ C.)

Lactams: e.g., N-methylpyrrolidone, $$\overline{CH_2-CH_2-CH_2-CO-N-CH_3}$$

(liquid range, $-16°$ to $202°$ C.)

Tetraalkylureas: e.g., tetramethylurea, (CH$_3$)$_2$N—CO—N(CH$_3$)$_2$ (liquid range, $-1.2°$ to $166°$ C.)

Monocarboxylic acid esters: e.g., ethyl acetate (liquid range, $-83°$ to $77.06°$ C.

Orthoesters: e.g., trimethylorthoformate, HC(OCH$_3$)$_3$ (boiling point, $103°$ C.)

Lactones: e.g., γ-(gamma)butyrolactone,

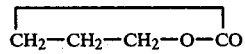

(liquid range, −42° to 206° C.)
Dialkyl carbonates: e.g., dimethyl carbonate, OC(OCH$_3$)$_2$ (liquid range, 2° to 90° C.)
Alkylene carbonates: e.g., propylene carbonate,

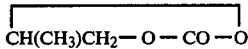

(liquid range, −48° to 242° C.)
Monoethers: e.g., diethyl ether (liquid range, −116° to 34.5° C.)
Polyethers: e.g., 1,1- and 1,2-dimethoxyethane (liquid ranges, −113.2° to 64.5° C. and −58° to 83° C., respectively)
Cyclic ethers: e.g., tetrahydrofuran (liquid range, −65° to 67° C.); 1,3-dioxolane (liquid range, −95° to 78° C.)
Nitroaromatics: e.g., nitrobenzene (liquid range, 5.7° to 210.8° C.)
Aromatic carboxylic acid halides: e.g., benzoyl chloride (liquid range, 0° to 197° C.); benzoyl bromide (liquid range, −24° to 218° C.)
Aromatic sulfonic acid halides: e.g., benzene sulfonyl chloride (liquid range, 14.5° to 251° C.)
Aromatic phosphonic acid dihalides: e.g., benzene phosphonyl dichloride (boiling point, 258° C.)
Aliphatic phosphonic acid dihalides: e.g., methyl phosphonyl dichloride (boiling point, 162° C.)
Aromatic thiophosphonic acid dihalides: e.g., benzene thiophosphonyl dichloride (boiling point, 124° C. at 5 mm.)
Cyclic sulfones: e.g., sulfolane,

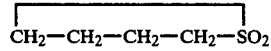

(melting point, 22° C.); 3-methylsulfolane (melting point, −1° C.)
Alkyl sulfonic acid halides: e.g., methanesulfonyl chloride (boiling point, 161° C.)
Alkyl carboxylic acid halides: e.g., acetyl chloride (liquid range, −112° to 50.9° C.); acetyl bromide (liquid range, −96° to 76° C.); propionyl chloride (liquid range, −94° to 80° C.)
Saturated heterocyclics: e.g., tetrahydrothiophene (liquid range, −96° to 121° C.); 3-methyl-2-oxazolidone (melting point, 15.9° C.)
Dialkyl sulfamic acid halides: e.g., dimethyl sulfamyl chloride (boiling point, 80° C., 16 mm.)
Alkyl halosulfonates: e.g., ethyl chlorosulfonate (boiling point, 151° C.)
Unsaturated heterocyclic carboxylic acid halides: e.g., 2-furoyl chloride (liquid range, −2° to 173° C.)
Five-membered unsaturated heterocyclics: e.g., 3,5-dimethylisoxazole (boiling point, 140° C.); 1-methylpyrrole (boiling point, 114° C.); 2,4-dimethylthiazole (boiling point, 144° C.); furan (liquid range, −85.65° to 31.36° C.)
Esters and/or halides of dibasic carboxylic acids: e.g., ethyl oxalyl chloride (boiling point, 135° C.)
Mixed alkyl sulfonic acid halides and carboxylic acid halides: e.g., chlorosulfonyl acetyl chloride (boiling point, 98° C. at 10 mm.)
Dialkyl sulfoxides: e.g., dimethyl sulfoxide (liquid range, 18.4° to 189° C.)
Dialkyl sulfates: e.g., dimethylsulfate (liquid range, −31.75° to 188.5° C.)
Dialkyl sulfites: e.g., dimethylsulfite (boiling point, 126° C.)
Alkylene sulfites: e.g., ethylene glycol sulfite (liquid range, −11° to 173° C.)

Of the above, the cosolvents believed to be preferred are nitrobenzene; nitropropane; tetrahydrofuran; 1,3-dioxolane; 3-methyl-2-oxazolidone; propylene carbonate; γ-butyrolactone; sulfolane; ethylene glycol sulfite; dimethyl sulfite; acetyl chloride and benzoyl chloride. Of the preferred cosolvents, the most preferred are nitropropane and acetyl chloride because they are more chemically inert to battery components and have long liquid ranges, and especially because they permit hghly efficient utilization of the cathode materials.

It is also within this invention to employ inorganic cosolvents such as inorganic oxyhalides or halides. These oxyhalide and halides, in addition to functioning as an electrolyte solvent in nonaqueous cells, may also function as an active reducible cathode thereby contributing to the overall active reducible material in such cells.

Useful anode materials are generally consumable metals and include aluminum, the alkali metals, alkaline earth metals and alloys of alkali metals or alkaline earth metals with each other and other metals. The term "alloy" as used herein and in the appended claims is intended to include mixtures, solid solutions such as lithium-magnesium, and intermetallic compounds such as lithium monoaluminide. The preferred anode materials are the alkali metals such as lithium, sodium and potassium, and alkaline earth metals such as calcium. The most preferred anode material is lithium.

In selecting the particular halogenocarbonylchalcogenyl halide for a particular cell in accordance with this invention, one should also consider the stability of the particular halogenocarbonylchalcogenyl halide in the presence of the other cell components and operating temperatures at which the cell is expected to perform. Thus a halogenocarbonylchalcogenyl halide should be selected that will be stable in the presence of the other cell components, including the cosolvent, if employed, and be electrochemically reducible in the cell system.

In addition, if it is desired to render the electrolyte solution more viscous or convert it into a gel, a gelling agent such as colloidal silica may be added.

The following examples are illustrative of the present invention and are not intended in any manner to be limitative thereof.

EXAMPLE 1

A 0.475 inch diameter, 1.65 inch high experimental cylindrical cell was constructed with a lithium anode, a porous carbon cathode collector and 2.4 ml of a cathode-electrolyte of ClC(O)SCl containing 0.5 M LiAlCl$_4$. The cell was continuously discharged across a 250-ohm load and delivered 0.69 ampere hour (AH) to a 2.5 volt cutoff at an average discharge voltage of 3.0 volts.

EXAMPLE 2

An experimental cell was constructed as in Example 1 except the liquid cathodic material was ClC(O)SCl: $S_2Cl_2$ in a 1:1 molar ratio. The cell had an open circuit voltage of 3.7 volts and when discharged across a 250-ohm load to a 2.5 volt cutoff, it delivered 0.26 AH at an average discharge voltage of 3.5 volts.

EXAMPLE 3

Three experimental cells were constructed as in Example 1 except the liquid cathodic material in each cell was ClC(O)SCl containing 1.0 M $LiAlCl_4$. The cells exhibited an average open circuit voltage of 3.7 volts and when discharged across a 250-ohm load to a 2.5 volt cutoff, they delivered an average of 0.82 AH at an average discharge voltage of about 3.0 volts.

EXAMPLE 4

Three experimental cells were constructed as in Example 3. The cells exhibited an average open circuit voltage of 3.7 volts and when discharged across a 75-ohm load to a 2.5 volt cutoff, they delivered an average of 0.45 AH at an average discharge voltage of 2.8 volts.

EXAMPLE 5

Two experimental cells were constructed as in Example 1 except the liquid cathode material in each cell was ClC(O)SCl containing 1.5 M $LiAlCl_4$. The cells exhibited an average open circuit voltage of 3.7 volts and when discharged across a 75-ohm load to a 2.5 volt cutoff, they delivered an average of 0.61 AH at an average discharge voltage of about 2.8 volts.

EXAMPLE 6

Two experimental cells were constructed as in Example 5. The cells exhibited an average open circuit voltage of 3.7 volts and when discharged across a 250-ohm load to a 2.5 volt cutoff, they delivered an average of 0.90 AH at an average discharge voltage of 3.0 volts.

While the present invention has been described with reference to many particular details thereof, it is not intended that these details should be construed as limiting the scope of the invention.

What is claimed:

1. A non-aqueous cell comprising an anode, a cathode collector and a cathode-electrolyte comprising an ionizing solute dissolved in a cathodic solvent of an halogenocarbonylchalcogenyl halide as represented by the formula $$X_1-\overset{\overset{\displaystyle O}{\|}}{C}-Y-X_2$$

where $X_1$ and $X_2$ are halogens and where Y is a chalcogen having an atomic number of 16 or more.

2. The non-aqueous cell of claim 1 wherein the halogen is selected from the group consisting of chlorine, fluorine, bromine and iodine.

3. The non-aqueous cell of claim 1 or 2 wherein the chalcogen is selected from the group consisting of sulfur, selenium and tellurium.

4. The non-aqueous cell of claim 1 wherein the halogenocarbonylchalcogenyl halide is ClC(O)SCl.

5. The non-aqueous cell of claim 1 wherein the halogenocarbonylchalcogenyl halide is FC(O)SCl.

6. The non-aqueous cell of claim 1 wherein the halogenocarbonylchalcogenyl halide is ClC(O)SBr.

7. The non-aqueous cell of claim 1, 4, 5 or 6 wherein a cosolvent is present in the cathode-electrolyte.

8. The non-aqueous cell of claim 1, 4, 5 or 6 wherein the solute is a complex salt of a Lewis acid and an inorganic ionizable salt.

9. The non-aqueous cell of claim 1, 4, 5 or 6 wherein the anode is selected from the group consisting of lithium, sodium, calcium and potassium.

* * * * *